United States Patent [19]

Hering

[11] Patent Number: 4,562,103
[45] Date of Patent: Dec. 31, 1985

[54] WEATHER RESISTANT BOARDS

[76] Inventor: Reinhard F. Hering, Via Matteo da Campione 5, CH 6911 Campione d'Italia, Switzerland

[21] Appl. No.: 434,234

[22] Filed: Oct. 14, 1982

Related U.S. Application Data

[63] Continuation-in-part of Ser. No. 74,669, Oct. 23, 1979, abandoned.

[51] Int. Cl.$^4$ ............................................. B32B 5/16
[52] U.S. Cl. ...................................... 428/76; 428/326; 428/496
[58] Field of Search .................. 428/326, 496, 76, 507

[56] References Cited

U.S. PATENT DOCUMENTS

| | | | |
|---|---|---|---|
| 1,776,790 | 9/1930 | Harvey et al. | 52/309.13 X |
| 1,955,984 | 4/1934 | Strobel | 428/496 |
| 2,125,847 | 8/1938 | McKenzie | 428/496 |
| 2,402,731 | 6/1946 | Clements | 52/556 X |
| 2,694,233 | 11/1954 | Page | 52/556 X |
| 3,332,193 | 7/1967 | Elmendorf | 52/309.13 X |
| 4,127,636 | 11/1978 | Flanders | 428/326 X |
| 4,190,041 | 8/1978 | Tellman | 428/496 X |

Primary Examiner—Henry F. Epstein
Attorney, Agent, or Firm—Martin J. Marcus

[57] ABSTRACT

Weather-resistant boards possessed of surface elasticity and pliancy by means of a permanently elastic, covering layer (for instance, particle boards, facade covering boards, and wall elements) and mouldings (for instance, containers, vessels, prefabricated building elements, and roof elements) of resin-impregnated wood fibres or other organic materials and inorganic materials, either as fibres or as particle materials are provided herein. Such weather resistant board comprises three layers. The first layer is an impregnatable, porous, base material which is constituted by a mixture of a curable resin with an organic base material, namely a lignocellulose fibrous or particle material, and an inorganic mineral fibrous material. The second layer is an outside elastic covering layer constituted by a vulcanized, weather-resistant resilient synthetic elastomeric material vulcanized thereon in situ at a temperature of at least 175° C. The third layer is an intermediate layer constituted by the outer unvulcanized resilient synthetic elastomeric material being both adhered securely to one outer surface of the base material and penetrated and impregnated below and into the same surface of the base material to be within the porous structure of the base material and being vulcanized therein in situ at a temperature of at least 175° C. The final product is an integral united material, in which the base and the coating material are impregnated one into the other within a facing area.

14 Claims, 6 Drawing Figures

4,562,103

WEATHER RESISTANT BOARDS

RELATED APPLICATION

This application is a continuation-in-part of application Ser. No. 74,669, filed Oct. 23, 1979, now abandoned.

BACKGROUND OF THE INVENTION (i) Field of the Invention

This invention relates to a method for the production of weather-resistant boards and to the weather-resistant boards so produced.

(ii) Description of the Prior Art

Many wood fibre materials for the building industry are limited to interior use since they are not sufficiently weather resistant to be used externally. However, since these products, i.e., particle boards, fibre boards, insulating boards, plywood, etc. are considered to be ideal and inexpensive building materials because of their economy, their insulation properties and their lightness, the art has been faced with the problem of providing the necessary weather resistancy and aging stability by altering the nature and composition of the raw materials and binding agents as well as by applying a coating to the outer skin. The first aim not only is to prevent water from penetrating into the board, but also to keep off atmospheric humidity. Any attempts to solve this problem solely by the type of and modification of, the usual glue mixtures, and by adding hydrophobic agents and/or anti-bacterial agents, have not provided any reliable results, since it was also desired that the positive properties of the material, e.g. low costs, light weight, heat insulation, bursting strength and standard glueing, should be retained. Such properties are impaired when, for instance, too large quantities of binding materials or mineral admixtures are used, which were expedients recently attempted to achieve sufficient weather resistancy. Therefore, measures heretofore used to provide such weather resistance of the structural composition within limits are coupled with an effective surface protection.

Accordingly, up to the present time, neither materials nor methods have been found which would guarantee that the required long lasting protection would remain effective against atmospheric influences to maintain the board resistant to mechanical damage or destruction within an acceptable economic scope. In this respect, coating the board by liquid preserving agents is becoming more obsolete, since, the industry has been successful in developing products which have high resistance to moisture, UV radiation and heat radiation, etc. and which avoids to a large extent cracking or embrittlement. Another economic process has been provided in which synthetic-resin-soaked papers are pressed on during the standard production of boards or mouldings. This, however, results in thin and susceptible surface coatings which are liable to crack because of the brittleness of the material as soon as the base material expands. This danger would be overcome by laminating previously produced weather-resistant, impact-resistant, and crack resistant materials, e.g., sheet metals, asbestos cement, or synthetic foils to the board. These, however, might peel-off under the permanent strain of and influence of the weather as the differences of the expansion-coefficients due to heat radiation result in the destruction of the glue joint and cause blistering.

Accordingly, up to the present time, no process exists for use on wood-fibre materials, plywood materials or other fibre materials, even those which have previously been made moisture resistant to the greatest possible extent, which can be surface coated with an insoluble layer.

SUMMARY OF THE INVENTION (i) Aims of the Invention

Thus, aims of the present invention are to provide such a building board which is economical to produce; which is resistant to weather influences; which is substantially non-ageing; which can follow all fluctuations of the base material without significant embrittling or cracking; which shows high abrasion-resistance; which has impact resistant capacities to mechanical influences of any kind; and which has been made substantially non-inflammable.

(ii) Statements of the Invention

This invention provides a weather-resistant board possessed of surface elasticity and pliancy by means of a permanently elastic covering layer comprising: an impregnatable, porous, base material constituted by a mixture of a curable resin, a base material comprising a lignocellulose fibrous or particle material and an inorganic mineral fibrous material; and an outer elastic covering layer constituted by a vulcanized, weather-resistant, synthetic elastomeric material vulcanized thereon in situ at a temperature of at least 175° C.; the vulcanized outer material being both adhered securely to one outer surface of the base material, and, in unvulcanized form, being penetrated and impregnated below and into the same outer surface of the base material to be within the porous structure of the base material, and being vulcanized therein in situ at a temperature of at least 175° C.

(iii) Other Features of the Invention

By another feature thereof, the outer material is adhered to two mutually opposed faces thereof.

By another feature, the outer material completely encases the board.

By yet a further feature, the elastomeric material is at least one of a natural vulcanizable rubber and a synthetic vulcanizable rubber.

By still another feature, the organic base and the inorganic base materials are also admixed with an adhesive agent.

By another feature of the organic base and the inorganic base materials are in precompressed form.

By still another feature, the outer material is provided with a further surface coating.

By a still further feature, the further surface coating comprises aluminum powder, aluminum foil or color pigments.

By still another feature, the further surface coating is in the form of a relief ornamental structure.

By other features, the board may be either flat or in molded shaped form. Thus, the board may be molded by bending, whereby the elasticity and flexibility of the outer skin takes over the function of a hinge. The board may alternatively be formed as wall, roof, or other building elements, with openings therein for doors and/or windows. Still further, it may be formed as vessels or containers.

(iv) Generalized Description of the Invention

As noted above, the provision of weather-resistant boards or mouldings of particle board, fibre board or plywood materials of aspects of this invention is based on the fact that, for a long time, natural rubber has proved to be reliable as a weather- and moisture-resistant coating material. The originally available natural rubber is, according to the present invention, replaced by synthetic rubbers, thus improving the application properties. By adding stabilizing agents and further additives, the brittleness and cracking under the influence of rain, ozone, light radiation, UV radiation and heat radiation has been substantially reduced so that today, for instance, roof films of synthetic rubber are expected to last 50 years without any damage. The highly useful products of the group of synthetic elastomers especially with regard to elasticity, abrasion resistance may be modified beyond their specific characteristics by altering the chemical composition and the type and quantity of added filling materials. The outer coating of the particle board first of all has to meet the condition of protecting against destructive weather influences and mechanical damages. The double faced coating, can be provided for higher surface stability, or it may provide a hinge or protecting edges. The synthetic rubber should have the usual expansion characteristics of shrinkage without cracking. Therefore, a viscous synthetic rubber composition can be used, which will result in a protection layer of optimum impact resistance and abrasion resistance after the full vulcanization process. Furthermore, it may be reinforced by wool shearing fleece, and other tissue, as well as admixtures of other fibres and/or other metallic fibres.

The essence of the present invention, however, does not rely on the use of highly weather-resistant synthetic rubber mixtures for outer coating. The essence of this invention is the fact that this coating penetrates into the base material of wood fibres and thus results in an insoluble composition during the first and only production run, without the necessity of any binding medium in the form of adhesive agents. These weather-resistant boards or mouldings consist of a compound laminated material, ready for any use as wall elements or roof elements in the building industry, the boards being protected on one or several sides or even edge protected. It may also be formed into pressed containers or vessels suitable to keep and to transport therein liquids or other wet materials.

The process for the manufacture of these weather resistant boards or mouldings of wood fibres and particle materials is based on the interrelationship of the two following procedures, under interacting conditions, so that they are carried out substantially simultaneously:
1. Compressing of the particle fibre mixture of the base material and hardening of the adhesive agents contained therein; and
2. Compressing and vulcanizing of the cover layer or layers coated mixture of synthetic rubber, or other elastomers, suitable filling materials and admixtures thereof.

The condensation and tempering or hardening of the resins and/or other adhesive agents as well as the vulcanization takes place under suitable conditions of pressure, temperature (175° C.) and time. The duration of the vulcanizing temperature is dependent on accelerators and filling materials within the material, and the thickness of the coating. These all vary and can be adjusted to the hardening period of the filling materials. The vulcanizing steps for the covering layers or layers on the one hand and the compressing of the base materials on the other hand, should be synchronized so that both processes may be carried out substantially simultaneously. Both material components are put into the shaping heat press tools together and in the selected order to match the structure of the finished compound material and are processed in one and the same manufacturing run to the final board-like compound material or mouldings with weather resistant outer skins. For this process, the same tools and plant installations can be used as are required or as one already available for the production of customary particle boards or mouldings.

In order to obtain a plain one-sided weather-resistant coated particle board, for instance, the outer coating is generally applied by spraying onto the mixture of fibre/particle/adhesive agents. If necessary, a parting component (for instance tin sheets and other plates or talc in powdered form). The outer coating can be supplied either in pre-fabricated unvulcanized films, or built up successively by mechanically spraying, pouring, sprinkling and so forth, in the required quantity. After laying down on the batt and, if desired pre-compressing it, the heat pressing follows and the further processing in the usual manner for the production of particle boards.

Of course, this process herein may be carried out in a different sequence and with a different number and quantity of ingredients used, so that for instance the weather resistant cover layer, which is to be vulcanized, is coated or applied on last and on top of and/or on both sides respectively. Furthermore, the mixture of fibre-particles and adhesive agents, with or without addition heat, may undergo a separate pre-compression primarily in order to prepress a moulding before the mixture for outer coating is put on and the final pressing follows.

Finally, according to further features of this invention, a decorating, reflecting or other surface coating or texture can be vulcanized onto the weather-resistant board for instance, aluminum powder or foil, or colour pigments may be used either at the beginning or the end of the coating procedure and may be incorporated into the process. The weather-resistant surface may be given a relief ornamental structure provided the pressing tools have been fitted out accordingly.

This weather-resistant coating provided by vulcanization is not limited to compound materials of fibre, or particle-like base materials, since it may be used for plywood or wooden strip boards and in principle also on several outer surfaces and even only partly on the surface. Finally, also other lignocellulose-containing organic and the inorganic, i.e. mineral-containing base materials may be used herein provided they can receive a weather-resistant outer coating of unvulcanized synthetic rubber or other elastomers and may be manufactured into boards or mouldings.

BRIEF DESCRIPTION OF THE DRAWINGS

In the accompanying drawings.

Figure 1:
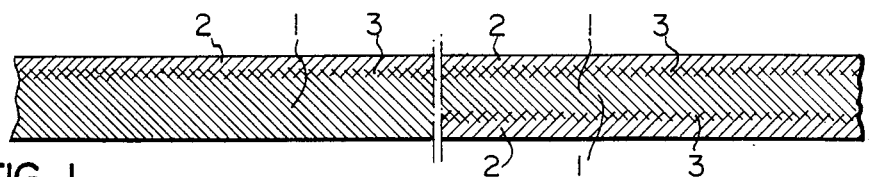
FIG. 1 is a section of two forms of weather resistant boards of aspects of this invention.

DESCRIPTION OF PREFERRED EMBODIMENTS (i) Description of FIG. 1

As seen in FIG. 1, the left hand side shows, in cross-section an upper-coated weather-resistant board while the right hand side shows in cross-section, a double-faced coated weather resistant board. The base material 1 consists essentially of a lignocellulose-containing and the mineral-containing fibre-particle/adhesive agents mixture, and the outer coating 2 consists essentially of a weather-resistant, vulcanizable synthetic rubber mixture. The outer coating 2 is both adhered to the outer surface of the base material 1 and penetrates and impregnates into the base material 1 at the region 3. Thus, the weather-resistant board comprises an integral uniting of the base material 1 and the synthetic rubber coating 2 after the synthetic rubber coating 2 has been vulcanized.

Figure 2:
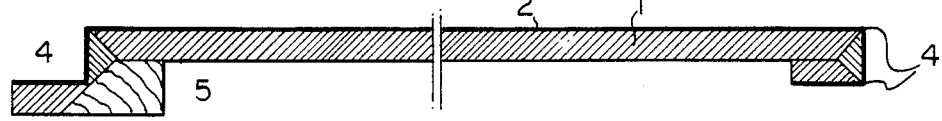
FIG. 2 is a section of a board of an aspect of this invention in the form of a facia board.

(ii) Description of FIG. 2

FIG. 2 shows, in cross section, the weather-resistant board of this invention in the form of a base material 1 and a vulcanized outer synthetic rubber layer 2. The board is shown as being bent completely around (at the right hand side) so that the outer synthetic rubber layer 2 extends around the side edges and portion of the bottom. The elasticity of the outer synthetic rubber layer enables the corners 4 to act as hinges.

On the left hand side, the board is shown as being bent for form a step, with the elasticity of the synthetic rubber outer coating enabling the outer and inner corners 4 to act as hinges. If necessary, a wooden slat 5 can be secured to the inner face behind the step.

Figure 3:
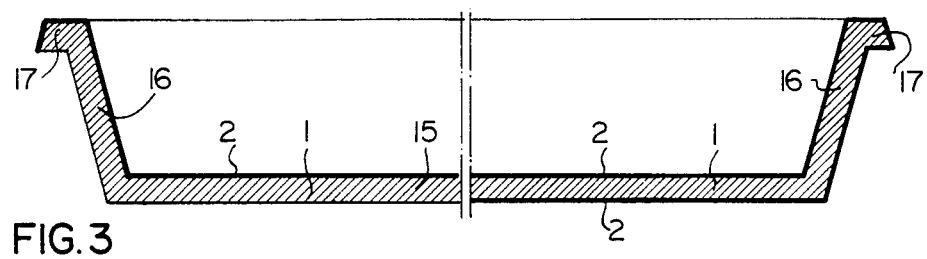
FIG. 3 is a section of a board of two other aspects of this invention in the form of a shaped vessel.

(iii) Description of FIG. 3

In FIG. 3, a premolded vessel having the cross-section of a bottom 15, side walls 16 and a rim 17 is provided formed of the single faced board consisting of the base material 1 and the outer coating 2 (shown on the left hand side), or alternatively of the double faced board consisting of the base material 1 and the outer synthetic rubber coatings 2 (shown on the right hand side). After or during the molding operation, the rubber surface 2 is vulcanized.

Figure 4:
FIG. 4 is a section of a board of another aspect of this invention including a window opening therein.

(iv) Description of FIG. 4

The board in FIG. 4 is shown in the form of a premolded prefabricated building element for use in a wall having a profile consisting of main wall portion 18, edge portion 19 and a window opening 20.

Figure 5:
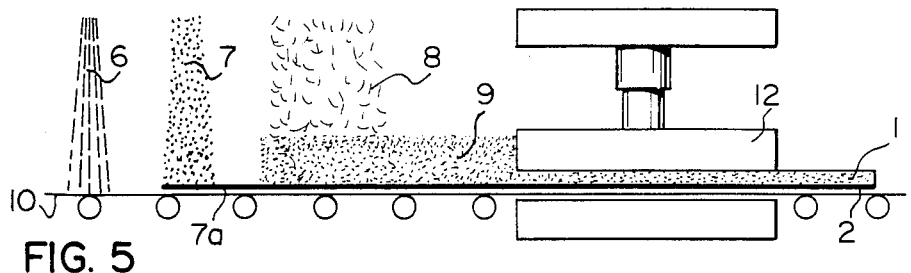
FIG. 5 is a schematic flow diagram illustrating the process of producing the board of this invention.

(v) Description of FIG. 5

FIG. 5 provides a description of the process for the manufacture of weather-resistant boards and mouldings according to this invention. A parting agent (e.g. talc in powdered form) is first applied, as by spraying, onto the charging platform 10. Then the granulated mixture of the unvulcanized synthetic rubber 7 is applied, and finally a mixture of fibre particles/adhesive agents 8 is applied thereon, to provide an uncompressed batt 9, having an unvulcanized synthetic rubber film 7a on one face thereof. The batt 9 is subjected to compression and heat (at least 175° C.) on the hot press 12. This simultaneously provides a condensation of the adhesive agents in the fibre particle mixture 1 and vulcanization of the weather-resistant vulcanizable outer synthetic rubber coating 2. The outer synthetic rubber coating 2 penetrates and is impregnated into the base material 1 and this results in the integrated, united board.

Figure 6:
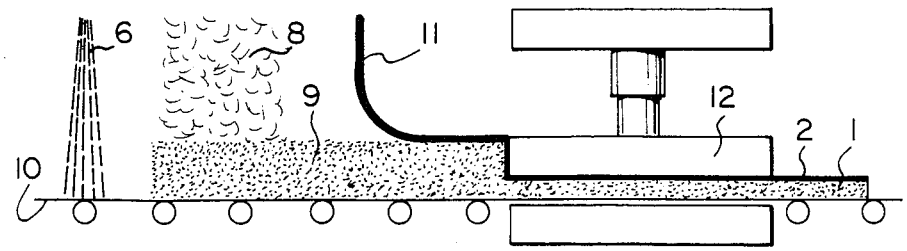
FIG. 6 is a schematic flow diagram illustrating the process of producing the board of this invention.

(iv) Description of FIG. 6

FIG. 6 shows another aspect of an alternative manufacturing process of this invention. Here the parting agent 6 is first sprayed onto the charging platform 10. Then the fibre particles/adhesive mixture 8 is applied to form a batt 9. Finally the outer synthetic rubber coating is applied on the form of an unvulcanized film of rubber 11. The further processing is as described for FIG. 5.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A weather-resistant impregnated board possessed of a surface elasticity and pliancy by means of a permanently elastic covering layer comprising: an impregnatable porous base material constituted by a mixture of a curable resin, a base material comprising a lignocellulose fibrous or particle material and an inorganic mineral fibrous material; and an outer elastic covering layer constituted by a vulcanized weather-resistant, resilient synthetic elastomeric material which has been vulcanized thereon in situ at a temperature of at least 175° C.; said vulcanized outer material being both adhered securely to one outer surface of said base material, and when in unvulcanized form, penetrated and impregnated below and into the same outer surface of said base material to be within the porous structure of said base material and being vulcanized therein in situ at a temperature of at least 175° C.

2. The weather-resistant board of claim 1 wherein said outer material is adhered to two mutually opposed faces thereof.

3. The weather-resistant board of claim 1 wherein said outer material completely encases said board.

4. The weather-resistant board of claim 1 wherein said elastomeric material is at least one of a natural vulcanizable rubber and a synthetic vulcanizable rubber.

5. The weather-resistant board of claim 2 wherein said base material is also admixed with an adhesive agent.

6. The weather-resistant board of claim 2 wherein said base material is in precompressed form.

7. The weather-resistant board of claim 2 which is in heat pressed form.

8. The weather-resistant board of claim 7 wherein said outer material is provided with a further surface coating selected from the group consisting of aluminum powder, aluminum foil, and color pigments.

9. The weather-resistant board of claim 7, wherein said outer material is provided with a further surface coating, comprising one of aluminum powder, aluminum foil, or color pigments.

10. The weather-resistant board of claim 2 wherein said outer material is provided with a further surface coating.

11. The weather-resistant board of claim 10 wherein said further surface coating is a coating selected from the group consisting of aluminum powder, aluminum foil and color pigments.

12. The weather-resistant board of claim 10 wherein said further surface coating is in the form of a relief ornamental structure.

13. The weather-resistant board of claim 1 in flat form.

14. The weather-resistant board of claim 1 in shaped molded form.

* * * * *